United States Patent
Sogge

[11] 4,058,352
[45] Nov. 15, 1977

[54] TRACK-TYPE VEHICLE WHEEL HAVING IMPACT RESISTANCE MEANS

[75] Inventor: John W. Sogge, Cedar Rapids, Iowa

[73] Assignee: Caterpillar Tractor Co., Peoria, Ill.

[21] Appl. No.: 712,562

[22] Filed: Aug. 9, 1976

[51] Int. Cl.² .............................................. B62D 55/16
[52] U.S. Cl. ...................................... 305/57; 74/229; 74/243 R; 267/182
[58] Field of Search ........................ 305/57, 56, 21, 24, 305/28, 5; 301/51; 267/182; 74/443, 229, 243 R

[56] References Cited

U.S. PATENT DOCUMENTS

| 1,046,969 | 12/1912 | Chaloner | 301/51 X |
| 3,889,550 | 6/1975 | Boggs et al. | 74/443 |

Primary Examiner—Robert B. Reeves
Assistant Examiner—John P. Shannon
Attorney, Agent, or Firm—Frank L. Hart

[57] ABSTRACT

A wheel of a driven track of a track-type vehicle has a rim connected to a hub with an annular chamber formed between the rim and the hub. An annular spring is positioned in the chamber and actuated by plungers in response to contacting a portion of the track. The spring controllably resists the impact forces of the track that are directed onto the wheel.

9 Claims, 2 Drawing Figures

TRACK-TYPE VEHICLE WHEEL HAVING IMPACT RESISTANCE MEANS

BACKGROUND OF THE INVENTION

In the operation of track-type vehicles, the track impacts the sprocket and other wheels of the track assembly with relatively large forces. These impact forces reduce the life of the impacting components and cause an undesirable amount of noise.

This invention therefore resides in apparatus for controllably resisting the impact forces on the track assembly wheels in response to operation of the track and thereby extending its life and reducing the noise of operation.

DETAILED DESCRIPTION OF THE INVENTION

Figure 1:
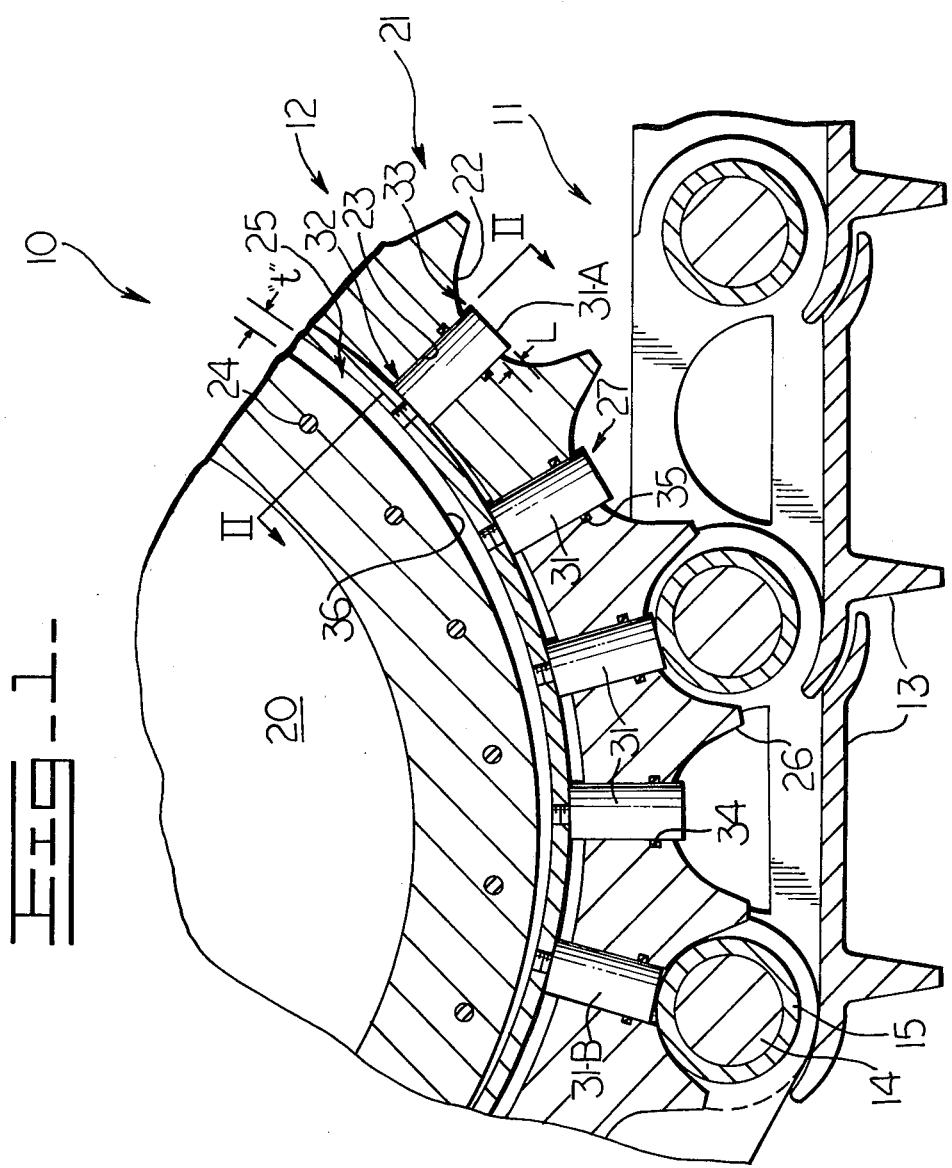
FIG. 1 is a diagrammatic side view in partial secton of a portion of a work vehicle having the apparatus of this invention.

Referring to FIG. 1, a work vehicle 10, for example a crawler tractor, has a continuous track 11 driven by a sprocket wheel 12 and being supported by an idler wheel and other wheels (not shown). The continuous track 11 is formed of a plurality of track shoes 13 interconnected by pins 14 that are covered by bushings 15. These elements are well known in the art as are the impact forces subjected onto the wheels 12 by the track 11. It should be understood, however, that the wheels of this invention can be any of the wheels of the track assembly, and for purposes of brevity, a sprocket wheel 12 is the only wheel shown.

Figure 2:
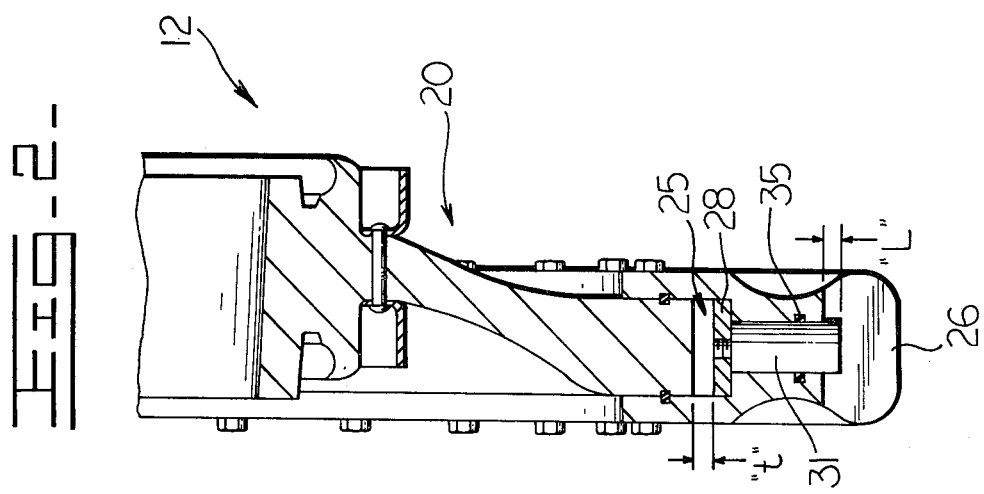
FIG. 2 is a diagrammatic sectional view taken along line II—II of FIG. 1.

The wheel 12 has a hub 20 connected to a rim 21 and to the power train (not shown) of the vehicle 10. The rim 21 has an outer surface 22 and a plurality of generally radially extending openings 23. The rim 21 is connected to the hub 20 by fasteners 24 and is of a configuration or construction sufficient to provide a generally coaxial annular chamber 25 defined by said hub 20 and rim 21. The generally radially extending openings 23 of the rim 21 open into said chamber 25.

Where the wheel 12 is a sprocket wheel, as shown in the drawings, the outer surface of the wheel 12 has a plurality of arcuately spaced apart teeth 26. The teeth 26 are spaced one from the other by an intervening root area. In the embodiment of FIGS. 1 and 2, the generally radially extending openings 23 of the rim 21 open on the root area 27. The openings 22 open on the root area 27 of the rim 21.

An annular spring 28 of hoop configuration is positioned in the chamber 25 and is of a size sufficient for forcibly urging against the rim 21.

A plunger 31 is provided for each of the openings 23 of the rim 21. Each of the plungers 31 have first and second end portions 32, 33. The first end portion 32 is of a size sufficient for extending through the associated opening 23 of the rim 21 in slidable relationship thereto.

The plungers 31 are each movable into and from the wheel chamber 25 and are controllably biased outwardly to the position of plunger 31A by the spring 28. The plungers 31 are preferably of columnar configuration and connected to the spring 28 by any means known in the art.

The first and second end portions 32, 33 of each plunger are of respective length and construction sufficient for biasing portions of the spring 28 toward the hub 20 in response to movement of the plunger 31 toward the hub 20. At the fully inserted position of the plunger 31 by the track 11, as shown by plunger 31B, portions of the spring 28 are biased toward the hub 20 by a track pin bushing 15 and the outer end of the plunger 31B is adjacent the outer surface 22 of the rim 21.

An annular groove 34 can be formed around each generally radially extending rim opening 23 and an O-ring 35 can be positioned in each groove 34 for sealing the annulus between the plunger 31 and rim 21 for preventing foreign material from entering the chamber 25 and obstructing flexure of the spring 28.

Preferably, the thickness "$t$" of the chamber portion between the innermost surface 36 of the chamber 25 and the spring 28 in the unbiased position of the spring 28, as shown by plunger 31A, is substantially equal to the length "$L$" that a plunger 31 extends outwardly from the rim 21 adjacent the respective opening 23.

In the operation of the apparatus, the track bushing 15 contacts the plunger 31 and biases the plunger 31 toward the hub 20. Thus biasing force on the plunger 31 is first resisted by the force of the spring 28, thereby preventing the track 11 from slapping wheel 10 with resultant undesirable noise. Biasing the spring 28 by the plunger 31 causes the spring to be deformed from the unbiased hoop configuration which provides the resistive forces subjected onto the bushing 15 via the plunger 31. The magnitude of the resistance can be controlled by varying the dimensions of the spring 28 and/or the chamber 25. Once the desired resistance force has been selected, one skilled in the art can readily calculate these dimensions.

By so constructing the resilient hoop spring and controllably confining said spring in an annular chamber of preselected dimensions, forces subjected upon the spring cause the spring to deflect with its deflection being restricted by the walls of the chamber. Further movement of the plunger causes compression of the hoop in the circumferential direction thereby establishing a preselected spring rate and subjecting reaction forces onto the plungers via the spring.

Other aspects, objects, and advantages of this invention can be obtained from a study of the drawings, the disclosure, and the appended claims.

What is claimed is:

1. A wheel of a track-type vehicle, comprising:
    a hub;
    a rim having an outer surface and a plurality of generally radially extending openings and being connected to the hub, said rim having an annular chamber, said openings of the rim opening into said chamber;
    an annular spring of hoop configuration positioned in said chamber and being of a size sufficient for forcibly urging against the rim about its outer periphery; and
    a plurality of plungers, each having a first end portion of a size sufficient for extending through an associated opening and outwardly from the outer surface of the rim and a second end portion in contact with said spring, said plunger being slidably movable into and from the chamber.

2. Apparatus, as set forth in claim 1, wherein the thickness of the chamber portion between an innermost surface of the chamber and the spring in the unbiased position of the spring is substantially equal to the length that a plunger extends outwardly from the rim adjacent the respective opening.

3. Apparatus, as set forth in claim 1, including:
an annular groove formed about each generally radially extending rim opening; and
an O-ring positioned in each annular groove for sealing the annulus between the plunger and the rim.

4. Apparatus, as set forth in claim 1, including:
teeth positioned about the outer periphery of said rim and being arcuately spaced one from the other by a root area and wherein the plurality of generally radially extending openings of the rim open on the root area of the rim.

5. Apparatus, as set forth in claim 4, wherein the second end portion of each plunger is of a length sufficient for biasing adjacent portions of the annular springs preselected distances toward the hub in response to movement of a second end of the plunger to a location adjacent the associated root area.

6. Apparatus, as set forth in claim 1, wherein the first end of each plunger is connected to the annular spring.

7. Apparatus, as set forth in claim 1, wherein the outer surface of the wheel has a plurality of arcuately spaced apart teeth and the generally radially extending openings of the rim are positioned between the teeth and are of a size sufficient for receiving a pin bushing of the associated track, contacting the spring with the pin bushing, and biasing a portion of said spring with the pin bushing a preselected distance toward the hub in response to said contact.

8. Apparatus, as set forth in claim 1, wherein each plunger has first and second end portions of generally common diameter.

9. A biasing element, comprising:
a housing having an outer periphery, an annular chamber of preselected dimensions, and at least one opening extending generally radially and opening at one end into the annular chamber and at the other end at the outer periphery;
a plunger slidably positioned in each opening and being movable into and from the chamber in response to forces subjected thereupon; and
an annular resilient spring of hoop configuration positioned with the chamber in the pathway of the plunger, said annular spring being of dimensions sufficient for deflection of the spring in the annular chamber in response to movement of the plunger into said chamber.

* * * * *